Patented Aug. 9, 1932

1,871,305

UNITED STATES PATENT OFFICE

EDWIN L. CROSBY AND ALBERT E. RHOADS, OF DETROIT, MICHIGAN, ASSIGNORS TO DETROIT ELECTRIC FURNACE COMPANY, OF DETROIT, MICHIGAN, A CORPORATION OF MICHIGAN

METHOD OF MELTING METAL BORINGS

No Drawing.    Application filed September 6, 1930. Serial No. 480,190.

This invention relates to a method of melting metal borings and the like.

The melting of metal borings has heretofore been carried out in electric and fuel fired furnaces of various types, but there are certain inherent disadvantages in the use of the types of furnaces heretofore employed for this purpose. In the use of a direct arc, stationary type of electric furnace, for instance, the melting of the iron or other metal borings does not proceed at a uniform and rapid rate, owing in part to the fact that a mass of metal borings is a poor conductor of heat and electricity. In using the direct arc electric furnace, wherein the metal to be heated forms one electrode of the arc, there is a tendency for a crater to be formed in the path of the arc, with the result that the borings do not melt uniformly or rapidly. The borings are more or less coated with oxide films which resist the passage of heat, thereby accentuating the difficulty above mentioned by reason of the tendency of the borings to "mat" together rather than to coalesce or fuse.

If a mass of borings be heated in a furnace of the direct or indirect arc type without mechanical or manual stirring it has been found impossible to melt any substantial portion of the charge. For instance, if a mass of borings be removed from a furnace which has been kept stationary during the heating period, the borings will be found to be in a matted unfused condition even though several times the normal amount of heat energy was used in the effort to effect complete fusion.

We have now found that metal borings can be satisfactorily melted in a movable type of indirect electric arc furnace. In this type of furnace, the movement of the furnace assists and accelerates the melting down of the borings and makes unnecessary any manual or other form of stirring. Furthermore, the heat for melting the borings is furnished by the radiant heat of the arc in a uniform manner impossible in other types of electric furnaces.

It is therefore an important object of this invention to provide an improved method of melting metal borings and the like by the high radiant heat of an electric arc out of contact with the borings themselves, while at the same time subjecting the mass of metal borings to a rocking action.

Other and further important objects of this invention will become apparent from the following description and appended claim.

Our method, when performed in a movable type of electric furnace, may be carried out either as an intermittent or batch operation or as a continuous one. In the former case, the heat or charge of borings, turnings, grindings or the like, may be processed, tapped, the furnace emptied and the operation repeated. In the continuous process, in order to compensate for the amount of metal tapped from the furnace periodically, the bath of metal in the furnace may be replenished by selectively charging small increments of the amount to be added, these small portions being added manually or automatically by a more or less regular schedule during the ensuing heating period.

In accordance with our invention, metal borings, turnings and the like are charged into a movable type electric furnace, preferably an electric furnace of the rocking type employing an indirect electric arc for heating. In view of the high temperature that can be obtained in this type of electric furnace, up to 3000° F. and over, ferrous metals, as well as the non-ferrous metals, can be melted by our process. During the melting operation, the furnace is rocked or oscillated at about two to four oscillations per minute, this rocking movement being sufficient without any other form of stirring to effect a sufficient mixing of the metal to insure a uniform and rapid rate of melting. Owing to the more rapid and uniform melting of the metal borings in this type of electric furnace, a much greater efficiency can be obtained than heretofore.

A very important advantage of this process is that an unusually high quality of metal is produced from borings melted in the indirect arc rocking furnace due in part to the non-oxidizing atmosphere within the melting chamber during the heating period, thus precluding the liability of oxidizing the borings or similar finely divided materials comprising the charge.

We are aware that numerous details of the process may be varied through a wide range without departing from the principles of this invention, and we, therefore, do not purpose limiting the patent granted hereon otherwise than necessitated by the prior art.

We claim as our invention:

In the production of molten metal for pouring from a furnace charge consisting of finely divided material such as turnings and borings which normally form a charge of low thermal and electric current conductivity, the method of producing metal in a substantially continuous process which consists in subjecting an initial furnace charge of loose borings, turnings or the like to only the radiant heat of an electric arc to melt the charge while oscillating the charge from two to four times a minute, periodically pouring a portion of the molten metal, and selectively feeding borings, turnings or the like to the charge to maintain a substantially constant bath of metal.

In testimony whereof, we have hereunto subscribed our names at Chicago, Cook county, Illinois.

EDWIN L. CROSBY.
ALBERT E. RHOADS.